(12) United States Patent
Nivet et al.

(10) Patent No.: US 10,074,887 B2
(45) Date of Patent: Sep. 11, 2018

(54) ANTENNA CHAMBER WITH HEAT VENTING

(71) Applicant: GOOGLE INC., Mountain View, CA (US)

(72) Inventors: Jonathan Nivet, Mountain View, CA (US); Vijay Asrani, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 129 days.

(21) Appl. No.: 15/196,630

(22) Filed: Jun. 29, 2016

(65) Prior Publication Data

US 2018/0006354 A1 Jan. 4, 2018

(51) Int. Cl.
*H01Q 1/02* (2006.01)
*H01Q 1/22* (2006.01)
*H01Q 1/48* (2006.01)

(52) U.S. Cl.
CPC .......... *H01Q 1/02* (2013.01); *H01Q 1/2258* (2013.01); *H01Q 1/48* (2013.01)

(58) Field of Classification Search
CPC .... H01Q 1/2258; H01Q 1/2266; H01Q 1/243; H01Q 1/44
See application file for complete search history.

(56) References Cited

U.S. PATENT DOCUMENTS

| | | |
|---|---|---|
| 2007/0176831 A1 | 8/2007 | Lagnado et al. |
| 2011/0006953 A1* | 1/2011 | Chiang ................ G06F 1/1616 343/702 |
| 2011/0241932 A1 | 10/2011 | Rowe |
| 2014/0062798 A1 | 3/2014 | Lin |
| 2014/0168893 A1 | 6/2014 | Niu et al. |
| 2015/0036277 A1 | 2/2015 | Yukawa et al. |
| 2016/0248893 A1* | 8/2016 | Kim ...................... H04M 1/026 |

FOREIGN PATENT DOCUMENTS

| | | |
|---|---|---|
| CN | 103034291 A | 4/2013 |
| WO | 1999050886 A1 | 10/1999 |
| WO | 2015/076486 A1 | 5/2015 |

OTHER PUBLICATIONS

International Search Report and the Written Opinion received for PCT Patent Application No. PCT/US2016/068269, dated Mar. 8, 2017, 13 pages.

* cited by examiner

*Primary Examiner* — Robert Karacsony
(74) *Attorney, Agent, or Firm* — Brake Hughes Bellermann LLP (57) ABSTRACT

According to an implementation, a computing device includes electronic circuitry, and an antenna and heat venting chamber having an antenna radiating element disposed in at least a first plane, a ground plane element disposed in at least a second plane, a first side wall member defining a plurality of perforations, and a second side wall member having a portion that is disposed opposite to the first side wall member, where the portion of the second side wall member defines at least one opening. The computing device includes a cooling system configured to vent heat generated by the electronic circuitry through the antenna and heat venting chamber.

19 Claims, 8 Drawing Sheets

ANTENNA CHAMBER WITH HEAT VENTING

BACKGROUND

Antennas in consumer electronic products require physical volume between the antenna itself and its ground plane to operate; the larger the physical volume, the higher the antenna bandwidth. As such, increasing the antenna bandwidth in consumer electronics places additional space requirements on devices already constrained for space.

SUMMARY

According to an implementation, a computing device includes electronic circuitry, and an antenna and heat venting chamber having an antenna radiating element disposed in at least a first plane, a ground plane element disposed in at least a second plane, a first side wall member defining a plurality of perforations, and a second side wall member having a portion that is disposed opposite to the first side wall member, where the portion of the second side wall member defines at least one opening. The computing device includes a cooling system configured to vent heat generated by the electronic circuitry through the antenna and heat venting chamber.

The computing device may include any one or more of the following features (or any combination thereof). The first side wall member may include a metal material, and the second side wall member may include a non-metal material. The computing device may include a substrate coupled to the antenna radiating element. The antenna radiating element may be coupled to an inner surface of the substrate, where the inner surface is exposed to a volume enclosed by the antenna and heat venting chamber. The antenna radiating element may be coupled to an outer surface of the substrate, where the outer surface is outside the volume enclosed by the antenna and heat venting chamber. The antenna radiating element may be a planar radiating element. The ground plane element may be configured to contact the first side wall member. A length of each of the plurality of perforations may be smaller than λ/4 of a highest frequency signal transmitted or received by the antenna radiating element. The cooling system may include a fan. The antenna and heat venting chamber may include an acoustic chamber. The acoustic chamber may be an air-tight chamber cavity having a speaker assembly. The second side wall member may be a plastic cover. The antenna radiating element may be coupled to a secondary portion of the second side wall member. The computing device may be a virtual reality headset. The computing device may be a laptop. The computing device may be a tablet.

According to an implementation, a computing device may include electronic circuitry, and an antenna and heat venting chamber having an antenna radiating element, and a ground plane element, where the ground plane element is separated from the antenna radiating element such that a space between the ground plane element and the antenna radiating element defines an antenna bandwidth of the antenna radiating element. The antenna and heat venting chamber includes a first side wall member defining a plurality of perforations, and a second side wall member defining at least one opening. The computing device includes a cooling system configured to vent heat generated by the electronic circuitry through the antenna and heat venting chamber in a first direction that extends through the plurality of perforations and the at least one opening.

The computing device may include one or more of the above and/or below features (or any combination thereof). The antenna and heat venting chamber may be a first antenna and heat venting chamber, and the cooling system may be a first fan, where the computing device further includes a second antenna and heat venting chamber, and a second fan configured to induce air flow through the second antenna and heat venting chamber. The plurality of perforations may define metal fins, and each of the metal fins have a length that extends between the antenna radiating element and the ground plane element. The length of each of the metal fins may be smaller than λ/4 of a highest frequency of operation for the antenna radiating element.

According to an implementation, a computing device includes an antenna and heat venting chamber having a substrate coupled to a metal enclosure of the computing device, an antenna radiating element coupled to a surface of the substrate, a ground plane element coupled to a metal internal enclosure, where the ground plane element is separated from the antenna radiating element such that a space between the ground plane element and the antenna radiating element defines an antenna bandwidth of the antenna radiating element, a metallic side wall member defining a plurality of metal fins, and a non-metallic cover coupled to the metal enclosure and the metal internal enclosure, where the non-metallic cover defines at least one opening. The computing device includes a cooling system configured to vent hot air generated by electronic circuitry of the computing device through the antenna and heat venting chamber.

DETAILED DESCRIPTION

The embodiments provide an antenna design that combines the antenna and heat venting chamber into one volume to save space in a computing device (e.g., headset, laptop, tablet, head-mounted display, phone, wearable (e.g., wrist-mounted) device, etc.). For instance, in devices with active heat dissipation using forced air convection through thermal fins, a volume already exists at the exit of the fins, which must be preserved for thermal dissipation performance.

According to the embodiments, the antenna chamber is placed into the volume that is used for thermal venting.

The antenna chamber may be defined by an antenna radiating element, a ground plane element disposed opposite to the antenna radiating element, a perforated metallic wall member, and a non-metallic wall member with air vents disposed opposite to the perforated metallic wall member. The bandwidth of the antenna may be determined by the space between the antenna radiating element and the ground plane element. The perforated metallic wall member may receive hot air from the venting of circuitry of the computing device. For example, the computing device may include a cooling system (e.g., a fan, heat pipe, etc.) that is used to cool one or more electrical components of the computing device, and the air that is used to cool the electronic assembly is vented through the antenna chamber. The space required for thermal dissipation (e.g., at the exit of the perforated metallic wall member), and the antenna space defining bandwidth (e.g., between the antenna radiating element and the ground plane element) is the same, thereby saving overall space of the device, and improving the antenna performance. In some examples, the perforations on the metallic wall member may define metal fins between slots, where the metal fins and/or slots have a length of less than a quarter wave of the highest frequency signal transmitted or received by the antenna of the computing device (e.g., the length is less than $\lambda/4$, where $\lambda$ is the wavelength of the highest frequency signal transmitted or received by the antenna). This design parameter of the perforations may assist with reducing the flow of antenna radiation from entering back through the metal fins, while at the same time permitting the flow of hot air through the antenna chamber, which may increase the performance of the antenna and/or increase the thermal dissipation performance.

Figure 1:
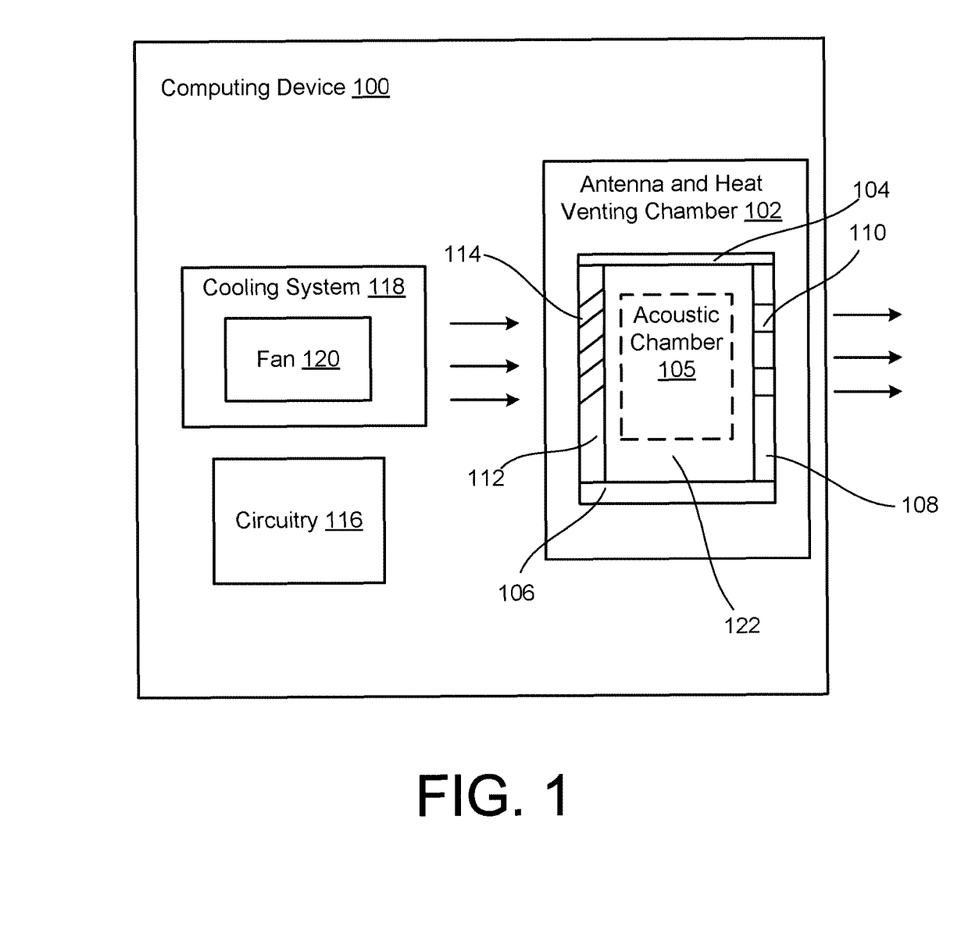
FIG. 1 illustrates an example of a computing device having an antenna and heat venting chamber for wireless communication and thermal dissipation according to an implementation.

FIG. 1 illustrates an example of a computing device 100 having an antenna and heat venting chamber 102 for wireless communication and thermal dissipation according an implementation. The antenna and heat venting chamber 102 includes a single, continuous volume 122 that serves as both the antenna space that defines the antenna bandwidth and the space for thermal dissipation of circuitry 116 of the computing device 100.

The computing device 100 may be any type of consumer computing device that has a cooling system 118 that uses forced air convection to dissipate heat from the circuitry 116 of the computing device 100, and wireless network circuitry configured to enable the computing device 100 to communicate over a network such as Wi-Fi, Bluetooth, NFC, mobile cellular network, and/or GPS, etc. The computing device 100 may include a mobile computing device such as a laptop, or a tablet or other mobile computing device. In some examples, the computing device 100 may include a headset such as a virtual reality headset. Generally, the computing device 100 may have a frame (referred to as a housing or chassis), and maybe be constructed with any type of conductive materials such as a metal-based material (e.g., aluminum, stainless steel, magnesium, alloy, titanium, etc.). The frame may be the structural framework (which may include one, two, or multiple different frame components coupled together or a single continuous frame) on which the components or circuitry is mounted. As such, the shape and type of the metal frame may vary widely depending on the type of computing device 100.

The cooling system 118 may include a fan 120 configured to induce air flow in order to dissipate or disperse heat from the circuitry 116 through the chamber 102. In some examples, the cooling system 118 may include other components that are used for heat dissipation such as a heat pipes, heat sinks, etc. The circuitry 116 may include any type of computing component that may generate heat, such as central processing units (CPUs), graphic processing units (GPUs), etc. For instance, when the circuitry 116 is actively running, the circuitry 116 may generate heat, and if the heat exceeds a threshold level, the heat may infer with the performance of the circuitry 116 or other components of the computing device 100. Typically, exhausting heat from the computing component(s) requires one or more perforations in the metal housing of the computing device 100. For instance, in some examples, heat is vented through metal fins, and a device may have to allocate space at the exit of the metal fins for good thermal dissipation performance. However, according to the embodiments, the antenna design combines the antenna and the heat venting chamber into one space, thereby saving space.

In some examples, the computing device 100 may be relatively compact, but can execute a number of applications, and be capable of wirelessly communicating via one or a number of different network interfaces. As such, the limited space and competing requirements (as well as market pressure for smaller devices), the placement of antennas may be a relatively large design challenge. Furthermore, the growing complexity of consumer devices in conjunction with the need for efficient antennas capable of radiating as much power as possible (while minimizing the power radiated towards a human head) provide a design challenge for the placement of components within the tight space inside the product. Also, another design challenge in compact devices is the noise radiated by nearby clocks and non-linear devices that can desensitize the radio receiver.

As shown in FIG. 1, the chamber 102 may include an antenna radiating element 104, a ground plane element 106, a first side wall member 112 having perforations 114, and a second side wall member 108 having air vents 110. The arrangement of the antenna radiating element 104, the ground plane element 106, the first side wall member 112, and the second side wall member 108 may define the volume 122 within the chamber 102. In some examples, the antenna radiating element 104 may be coupled to a substrate, and the substrate may be coupled to the metal frame of the computing device 100. The ground plane element 106 may be disposed a distance away from the antenna radiating element 104 and coupled to another portion of the frame of the computing device 100. The first side wall member 112 may include a portion that extends between the ground plane element 106 and the antenna radiating element 104 on one side of the chamber 102, and the second side wall member 108 may include a portion that extends between the ground plane element 106 and the antenna radiating element 104 on the other side of the chamber 102.

The chamber 102 may be disposed at an output of the cooling system 118. In some examples, the fan 120 of the cooling system 118 is placed directly adjacent to the chamber 102. In some examples, the first side wall member 112 is operatively coupled to the output of the cooling system 118. The heat generated by the circuitry 116 may be vented by the cooling system 118 through the chamber 102. For example, the cooling system 118 may force hot air through the chamber 102, e.g., through the perforations 114 of the first side wall member 112 and then through the air vents 110 of the second side wall member 108.

The antenna radiating element 104 may include a radiating element configured to enable the computing device 100 to wireless communicate over a network. The antenna radiating element 104 may operate in conjunction with the wireless network circuitry to transmit and receive wireless signals over the network. In some examples, the antenna radiating element 104 may be configured to send and receive wireless signals over the Internet (e.g., Wi-Fi, mobile network) and/or a short-range communication networks (e.g., Bluetooth, NFC, etc.).

The antenna radiating element 104 may include a conductive material such as any type of metal-based material, for example. The shape/size of the antenna radiating element 104 may depend on the type of computing device 100. In some examples, the antenna radiating element 104 is a single planar metal element. In other examples, the antenna radiating element 104 may include one or multiple portions of metal material that may extend in more than one plane. In some examples, the antenna radiating element 104 may be coupled to a substrate such as a printed circuit board (PCB), where the substrate is coupled to a portion of the metal frame of the computing device 100. In some examples, the antenna radiating element 104 is coupled to a FR4 substrate PCB.

The ground plane element 106 may be any type of material that can function as a ground plane for the antenna radiating element 104. In some examples, the ground plane element 106 is a metal ground spring. The ground plane element 106 may be coupled to a portion of the metal frame that is opposite to the antenna radiating element 104. The ground plane element 106 may extend and contact a portion of the first side wall member 112. The ground plane element 106 may extend and contact a portion of the second side wall member 108. In some examples, the arrangement of the ground plane element 106, the first side wall member 112, and the second side wall member 108 form a Faraday cage to shield the chamber 102 from any noise from neighboring circuitry (e.g., the circuitry 116). The ground plane element 106 may be disposed a distance away from the antenna radiating element 104. In some examples, the antenna radiating element 104 is disposed (or at least partially disposed) in a first plane, and the ground plane element 106 is disposed (or at least partially disposed) in a second plane, where the second plane is parallel to the first plane. The space between the antenna radiating element 104 and the ground plane element 106 may define the antenna's bandwidth; the larger the space between the ground plane element 106 and the antenna radiating element 104, the larger the bandwidth. When driven by a driving frequency, the antenna radiating element 104 in conjunction with the volume 122 may create a frequency resonance that falls within one or more frequency bands.

The first side wall member 112 may extend between the antenna radiating element 104 and the ground plane element 106. In some examples, an end portion of the first side wall member 112 is coupled to the substrate having the antenna radiating element 104, and the other end portion of the first side wall member 112 is coupled to the ground plane element 106. The first side wall member 112 may be the part of the chamber 102 that receives the heat vented by the cooling system 118 via the perforations 114. The first side wall member 112 may be metallic. The perforations 114 on the first side wall member 112 may define metal fins and slots between the metal fins. In some examples, the perforations 114 may be slots that extend linearly and parallel to each other. In some examples, the perforations 114 are equally spaced part along the length of the first side wall member 112. In some examples, the slots and/or the metal fins defined by the perforations 114 extend linearly in a first orientation (e.g., the first orientation is where each of the slots and/or metal fins have an elongated length that extends between the antenna radiating element 104 and the ground plane element 106). In other examples, the slots and/or the metal fins defined by the perforations 114 extend linearly in a second orientation, where the second orientation is orthogonal to the first orientation.

In some examples, the elongated slot length of the slots and/or the elongated metal fin length of the metal fins is smaller than $\lambda/4$ of the highest frequency signal transmitted or received by the antenna radiating element 104. This design parameter of the length of the slots and/or metal fins may assist with reducing the flow of antenna radiation of electromagnetic waves through the first side wall member 112 (e.g., in a direction opposite to the air flow direction shown in FIG. 1), while at the same time permitting the flow of hot air through the chamber 102, which may increase the performance of the antenna and/or increase the thermal dissipation performance.

The second side wall member 108 may be disposed opposite to the first side wall member 112. The air vents 110 of the second side wall member 108 permit the hot air to pass through the chamber 102. The air vents 110 may be openings through the second side wall member 108 so as not to obstruct the airflow through the chamber 102. In some examples, the number of air vents 110 may be smaller than the number of perforations 114 on the first side wall member 112. In some examples, the size of the air vents 110 may be larger than the size of the perforations 114 on the first side wall member 112. In some examples, the second side wall member 108 may include a non-metal material. In some examples, the second side wall member 108 includes a plastic material. In some examples, the second side wall member 108 includes a plastic cover defining one or more air vents 110. The second side wall member 108 may include a portion that extends between the antenna radiating element 104 and the ground plane element 106. In some examples, the second side wall member 108 includes a portion that extends over the antenna radiating element 104.

In some examples, the volume 122 defined by the chamber 102 is substantially devoid of any components (e.g., empty space). In other examples, the volume 122 defined by the chamber 102 includes an air-sealed acoustic chamber cavity 105 having a speaker assembly. This acoustic chamber cavity 105 may be self contained and have an opening for the sound, that is different from the air vents 110. For example, in some examples, further space saving may be achieved by disposing the acoustic chamber cavity 105 within the chamber 102.

Figure 2:
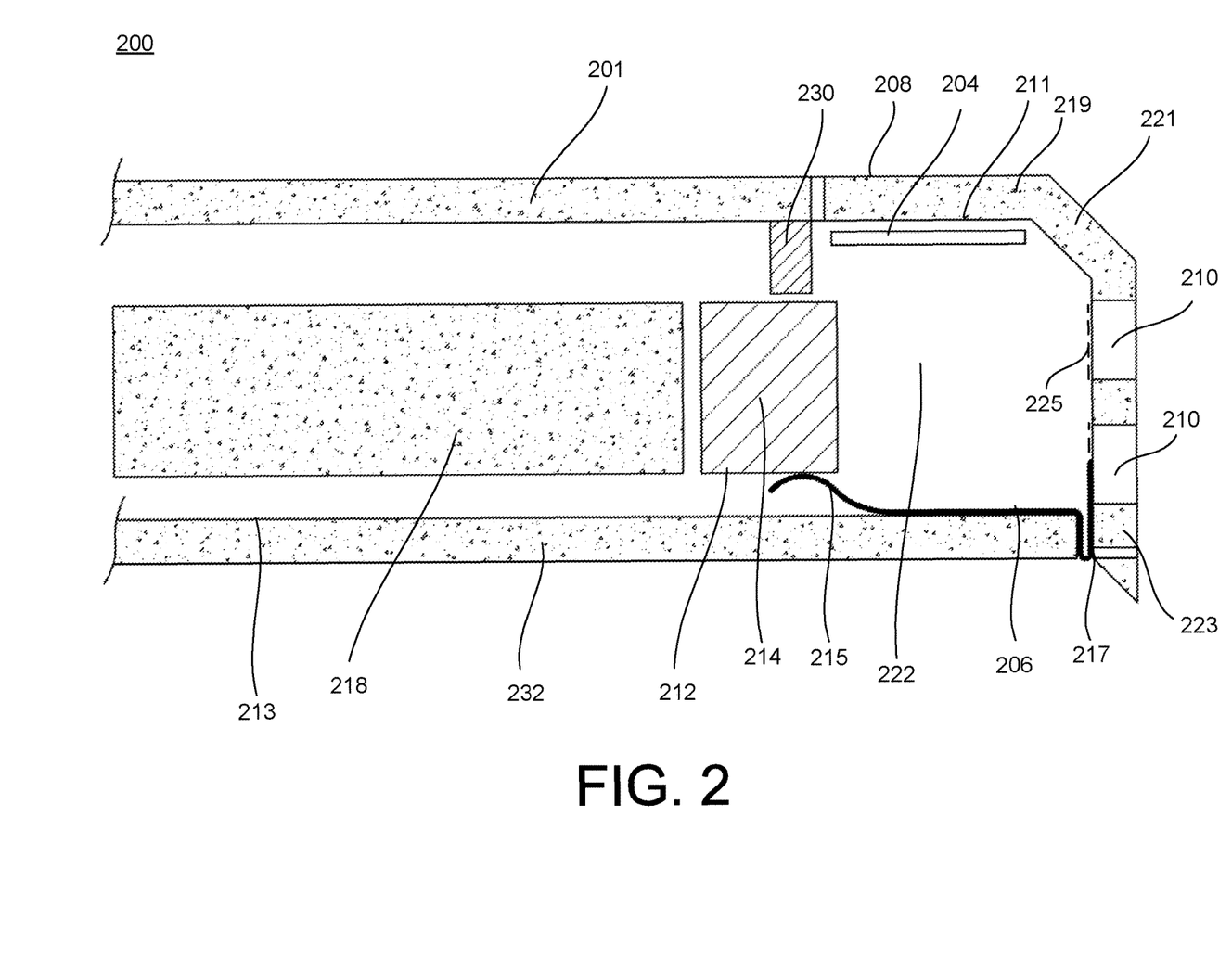
FIG. 2 illustrates an example of a portion of a computing device having an antenna and heat venting chamber for wireless communication and thermal dissipation according to another implementation.

FIG. 2 illustrates an example of a portion of a computing device 200 having an antenna and heat venting chamber for wireless communication and thermal dissipation according an implementation. The computing device 200 may be any type of device having an antenna system and a cooling system that uses forced air convection. In some examples, the computing device 200 includes a mobile computing device such as a laptop, a tablet, or other mobile computing devices. In some examples, the computing device 200 may include a headset device such as a virtual reality headset.

The antenna and heat venting chamber defines a volume 222 that functions as both the antenna chamber and the heat venting chamber. In some examples, the volume 222 is devoid of any components (e.g., empty space). In other examples, the volume 222 includes an acoustics chamber (e.g., the acoustics chamber 105 of FIG. 1). In some examples, the volume 222 may be defined by an antenna radiating element 204, a ground plane element 206, a metallic side wall member 212 with perforations 214, and a non-metallic side wall member 208 with air vents 210. The volume 222 may be disposed adjacent to a cooling system 218 that vents heat through the volume 222.

In some examples, the antenna radiating element 204 is coupled to a metal enclosure 201 of the computing device 200. For example, the antenna radiating element 204 may be coupled to a substrate (e.g., a printed circuit board (PCB)), and the substrate having the antenna radiating element 204 may be coupled to a portion of the metal enclosure 201 via fasteners (e.g., screws) or other attachment mechanisms. In other examples, the antenna radiating element 204 may be coupled to an inner surface 211 of the non-metallic side wall member 208. The antenna radiating element 204 may be any type of radiating element configured to enable the computing device 200 to wireless communicate over a network. In some examples, the antenna radiating element 204 may operate in conjunction with wireless network circuitry to transmit and receive wireless signals over the network via one or more frequency bands. In some examples, the antenna radiating element 204 may be configured to send and receive wireless signals over the Internet (e.g., Wi-Fi, mobile network) and/or short-range communication networks (e.g., Bluetooth, NFC, etc.). The antenna radiating element 204 may include a metal-based material. The shape/size of the antenna radiating element 204 may depend on the type of computing device 200. In some examples, the antenna radiating element 204 is a single planar metal element.

The ground plane element 206 may be any type of material that can function as a ground plane for the antenna radiating element 204. In some examples, as shown in FIG. 2, the ground plane element 206 may be a metal ground spring. In other examples, the ground plane element 206 may be the mechanical internal enclosure, a printed circuit board (PCB) or a flexible PCB. In some examples, the ground plane element 206 may be a metallic coating onto a non-metallic enclosure part. However, the ground plane element 206 may be any type of metallic component that extends opposite to the antenna radiating element 204. In some examples, the ground plane element 206 is coupled to and extends along a surface 213 of a metal internal enclosure 232. In some examples, the ground plane element 206 includes a portion 215 that extends and contacts the metallic side wall member 212 in order to ground the metallic side wall member 212. In some examples, the ground plane element 206 includes a portion 217 that extends and contacts the non-metallic side wall member 208.

As shown in FIG. 2, the ground plane element 206 may be disposed a distance away from the antenna radiating element 204. The space between the antenna radiating element 204 and the ground plane element 206 may define the antenna's bandwidth; the larger the space between the ground plane element 206 and the antenna radiating element 204, the larger the bandwidth. When driven by a driving frequency, the antenna radiating element 204 in conjunction with the antenna space may create a frequency resonance that falls within one or more frequency bands.

The metallic side wall member 212 may receive the heat vented by the cooling system 218 via its perforations 214. The cooling system 218 may be the cooling system 118 of FIG. 1. For example, the cooling system 218 may include a fan configured to induce air flow in order to dissipate heat from circuitry through the volume 222. In some examples, the cooling system 218 may include other components that are used for heat dissipation such as a heat pipes, heat sinks, etc.

The metallic side wall member 212 may extend between the antenna radiating element 204 and the ground plane element 206. In some examples, the metallic side wall member 212 may be disposed between the metal enclosure 201 and the metal internal enclosure 232. In some examples, the computing device 200 includes a conductive component 230 disposed between the metallic side wall member 212 and the metal enclosure 201. In some examples, the conductive component 230 is conductive foam or metal spring clips.

The perforations 214 on the metallic side wall member 212 may define metal fins and slots between the metal fins. In some examples, the perforations 214 may be slots that linearly extend parallel to each other. In some examples, the perforations 214 are equally spaced part along the length of the metallic side wall member 212. In some examples, the slots and/or the metal fins defined by the perforations 214 extend linearly in a first orientation (e.g., the first orientation is where each of the slots and/or metal fins have an elongated length that extends between the antenna radiating element 204 and the ground plane element 206). In other examples, the slots and/or the metal fins defined by the perforations 214 extend linearly in a second orientation, where the second orientation is orthogonal to the first orientation. In some examples, the elongated slot length of the slots and/or the elongated metal fin length of the metal fins is smaller than $\lambda/4$ of the highest frequency signal transmitted or received by the antenna radiating element 204. This design parameter of the length of the slots and/or metal fins may assist with reducing the flow of antenna radiation through the metallic side wall member 212, while at the same time permitting the flow of hot air through the volume 222, which may increase the performance of the antenna and/or increase the thermal dissipation performance.

The non-metallic side wall member 208 may include a portion that is disposed opposite to the metallic side wall member 212. In some examples, the non-metallic side wall member 208 includes a plastic material. The non-metallic material (plastic material) may permit the antenna radiation to enter/exit the volume 222 in order to transmit/receive wireless signals. However, the ground plane element 206 (disposed on the inner surface 213 of the metal internal enclosure 232), the metallic side wall member 212, and the conductive component 230 (e.g., conductive form) may define a Faraday cage or Faraday shield to block (or substantially prevent) electromagnetic fields. For example, the ground plane element 206 may ground the metal internal enclosure 232 within the volume 222, and ground the metallic side wall member 212 and the conductive component 230, thereby forming a Faraday cage or shield around the antenna radiating element 204.

In some examples, the non-metallic side wall member 208 is a plastic cover that is coupled to the metal enclosure 201 and the metal internal enclosure 232. In some examples, the non-metallic side wall member 208 may include a first portion 219, a second portion 221, and a third portion 223. The first portion 219 may extend over the antenna radiating element 204. The first portion 219 may be coupled to the metal enclosure 201. In some examples, the first portion 219 is removably coupled to the metal enclosure 201. The third portion 223 may be disposed opposite to the metallic side wall member 212. The third portion 223 may define the air vents 210. Although two air vents 210 are illustrated in FIG. 2, the third portion 223 may define any number of air vents including one or more than two air vents 210. The third portion 223 may be coupled to the metal internal enclosure 232. In some examples, the third portion 223 is removably coupled to the metal internal enclosure 232. In some examples, the portion 217 of the ground plane element 206 may be disposed between the third portion 223 and the edge of the metal internal enclosure 232. In some examples, the third portion 223 may be perpendicular to the first portion 219. The second portion 221 may connect the first portion 219 and the third portion 223. In some examples, the second portion 221 may be curved or bent. In some examples, the non-metallic side wall member 208 does not include the second portion 221, but rather the first portion 219 is directly connected to the third portion 223. In some examples, the air vents 210 may be internally covered with a fabric 225 or other non-metallic mesh to prevent external bodies (e.g., dust, water, etc.) from entering the volume 22, but allows the air flow to exit.

The air vents 210 may allow the heat to pass through the volume 222. For instance, the air vents 210 may be openings through the non-metallic side wall member 208 so as not to obstruct the airflow through the volume 222. In some examples, the number of air vents 210 may be smaller than the number of perforations 214 on the metallic side wall member 212. In some examples, the size of the air vents 110 may be larger than the size of the perforations 214 on the metallic side wall member.

Figure 3:
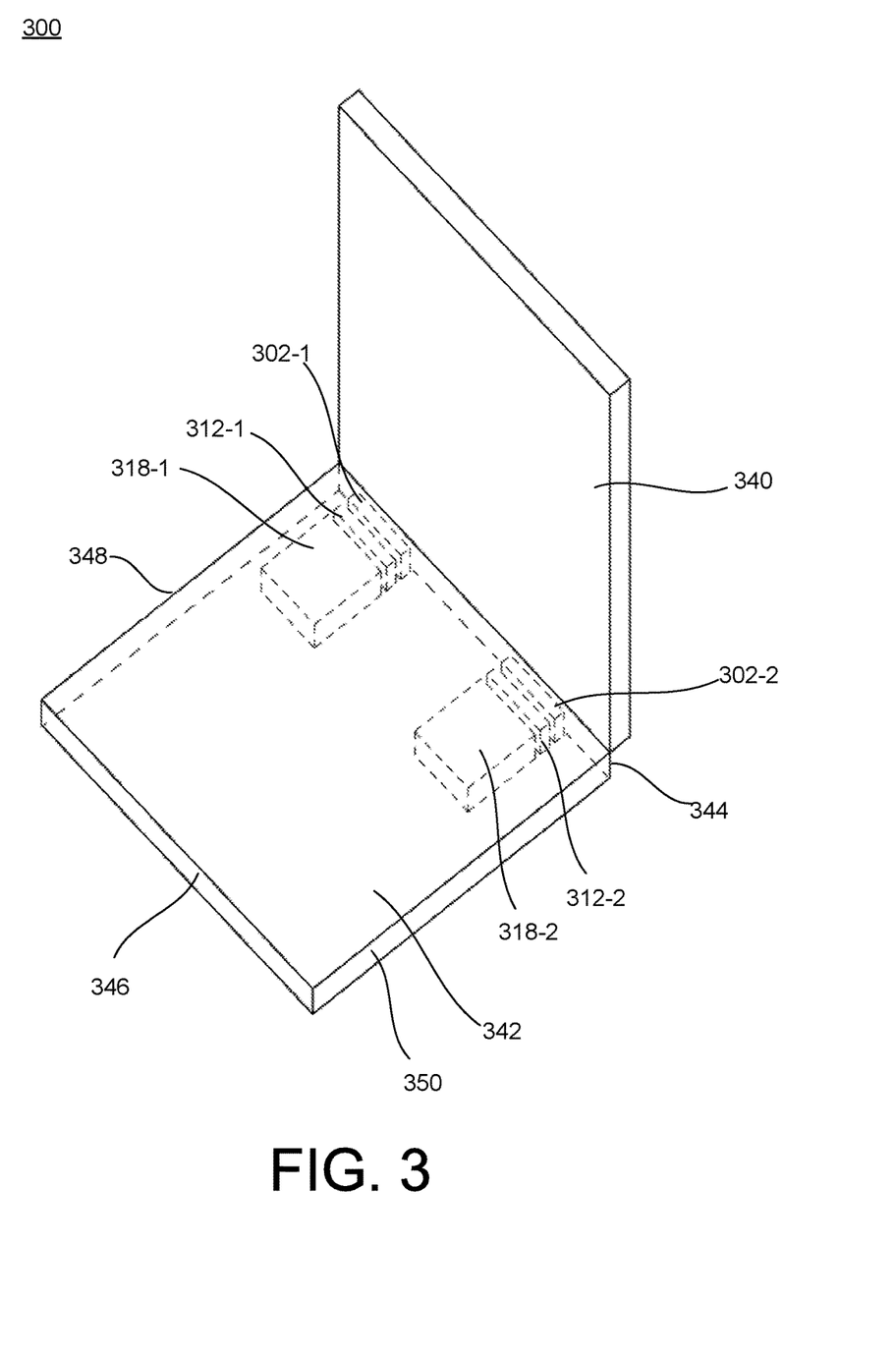
FIG. 3 illustrates an example of a laptop having two antenna and heat venting chambers for wireless communication and thermal dissipation according to an implementation.

FIG. 3 illustrates an example of a laptop 300 having two antenna and heat venting chambers for wireless communication and thermal dissipation according an implementation. The laptop 300 may have a display portion 340 movably coupled to a base portion 342. The base portion 342 may have a front portion 346, a back portion 344, a first side portion 348, and a second side portion 350.

The base portion 342 may include a first fan 318-1, first metal fins 312-1, and a first antenna and heat venting chamber 302-1. These components may be located in an area within a structure of the base portion 342 that is proximate to the back portion 344 and the first side portion 348 such that heat transferred through the first antenna and heat venting chamber 302-1 is vented through the back of the base portion 342. The base portion 342 may include a second fan 318-2, second metal fins 312-2, and a second antenna and heat venting chamber 302-2. These components may be located in an area within the structure of the base portion 342 that is proximate to the back portion 344 and the second side portion 350 such that heat transferred through the second antenna and heat venting chamber 302-2 is vented through the back of the base portion 342. Although FIG. 3 illustrates two sets of antenna and heat venting chambers, the base portion 342 may include only one set of the fan, metal fins, and the antenna and heat venting chamber. In other examples, the location of these components are positioned such that heat is vented through one or both of the first side portion 348 and/or the second side portion 350.

In some examples, each of the first fan 318-1 and the second fan 318-2 can be at least part of the cooling systems/fans described with reference to FIGS. 1-2. In some examples, the first fan 318-1 is substantially similar to the second fan 318-2. In other examples, the first fan 318-1 is different from the second fan 318-2 (e.g., different type, and/or size). In some examples, each of the first metal fins 312-1 and the second metal fins 312-2 is the perforated metallic side wall described with reference to FIGS. 1-2. In some examples, the perforations defined by the first metal fins 312-1 are the same as the perforations defined by the second metal fins 312-2. In other examples, the perforations defined by the first metal fins 312-1 are different than the perforations defined by the second metal fins 312-2 (e.g., different number of slots, different shape, and/or different length, etc.). In some examples, each of the first antenna and heat venting chamber 302-1 and the second antenna and heat venting chamber 302-2 is substantially similar to the antenna and heat venting chamber described with reference to FIGS. 1-2. For example, the first antenna and heat venting chamber 302-1 may include the antenna radiating element 104/204, the ground plane element 106/206, and the non-metallic side wall member 108/208. The first antenna and heat venting chamber 302-1 may also be defined by the first metal fins 312-1 (e.g., the perforated metallic side wall 112/212) disposed opposite to the non-metallic side wall member 108/208. The second antenna and heat venting chamber 302-2 may include the same components as the first antenna and heat venting chamber 302-1.

Figure 4:
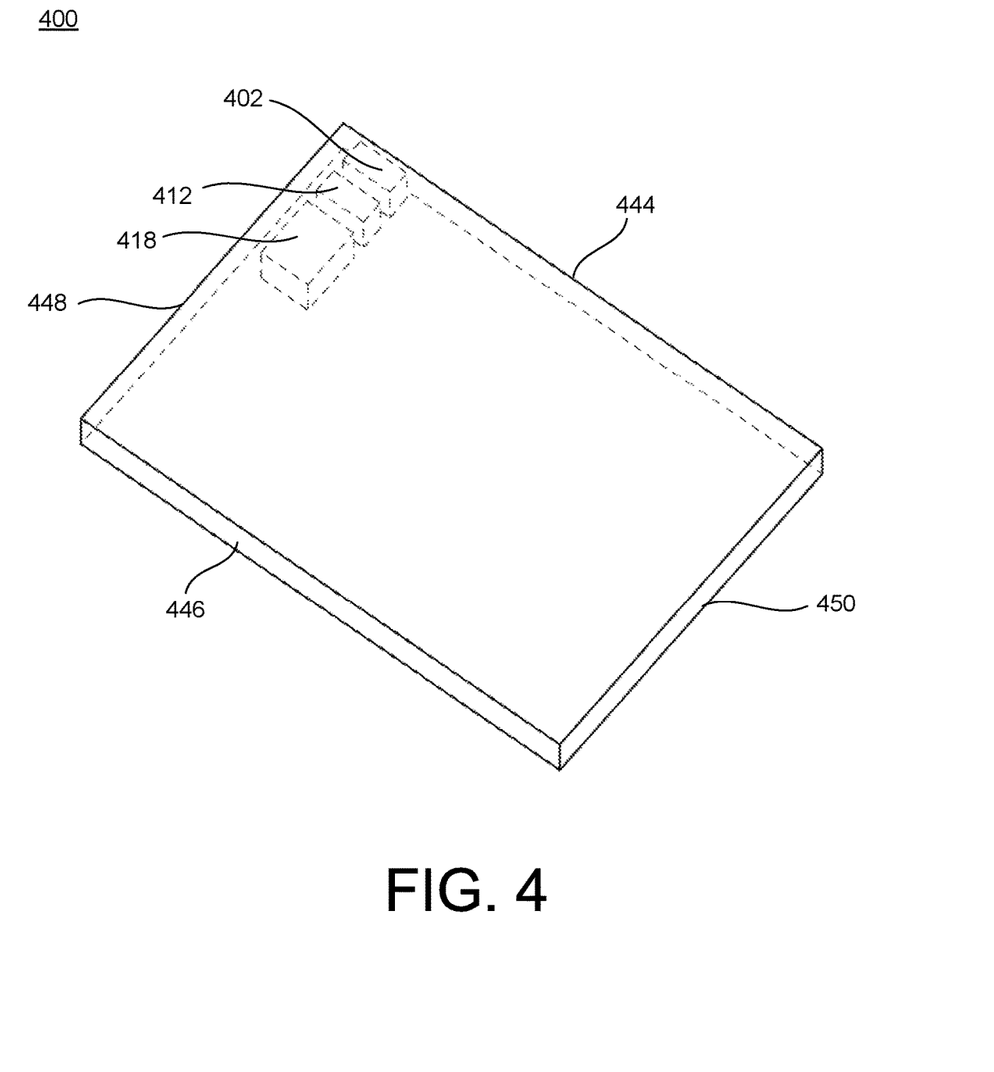
FIG. 4 illustrates an example of a tablet having an antenna and heat venting chamber for wireless communication and thermal dissipation according to an implementation.

FIG. 4 illustrates an example of a tablet 400 having an antenna and heat venting chamber 402 for wireless communication and thermal dissipation according an implementation. The tablet 400 may include a front portion 446, a back portion 444, a first side portion 448, and a second side portion 450. The tablet 400 may include a fan 418, metal fins 412, and an antenna and heat venting chamber 402. In some examples, the fan 418, the metal fins 412, and the antenna and heat venting chamber 402 may be disposed within a structure of the tablet 400 at a location proximate to the first side portion 448 and the back portion 444 such that heat is vented through the antenna and heat venting chamber 402 at the back of the tablet 400 (e.g., away from a user). In other examples, these components are disposed at a location proximate to the second side portion 450 and the back portion 444, or at locations in which the heat is vented through one of the first side portion 448 and the second side portion 450.

Similar to FIG. 3, the fan 418 can be at least part of the cooling systems/fans described with reference to FIGS. 1-2. The metal fins 412 may be substantially similar to the perforated metallic side wall member described with reference to FIGS. 1-2, and the antenna and heat venting chamber 402 may be substantially similar to the antenna and heat venting chamber described with reference to FIGS. 1-2. For example, the antenna and heat venting chamber 402 may include the antenna radiating element 104/204, the ground plane element 106/206, and the non-metallic side wall member 108/208. The antenna and heat venting chamber 402 may also be defined by the metal fins 412 (e.g., the perforated metallic side wall member 112/212) disposed opposite to the non-metallic side wall member 108/208.

Figure 5A:
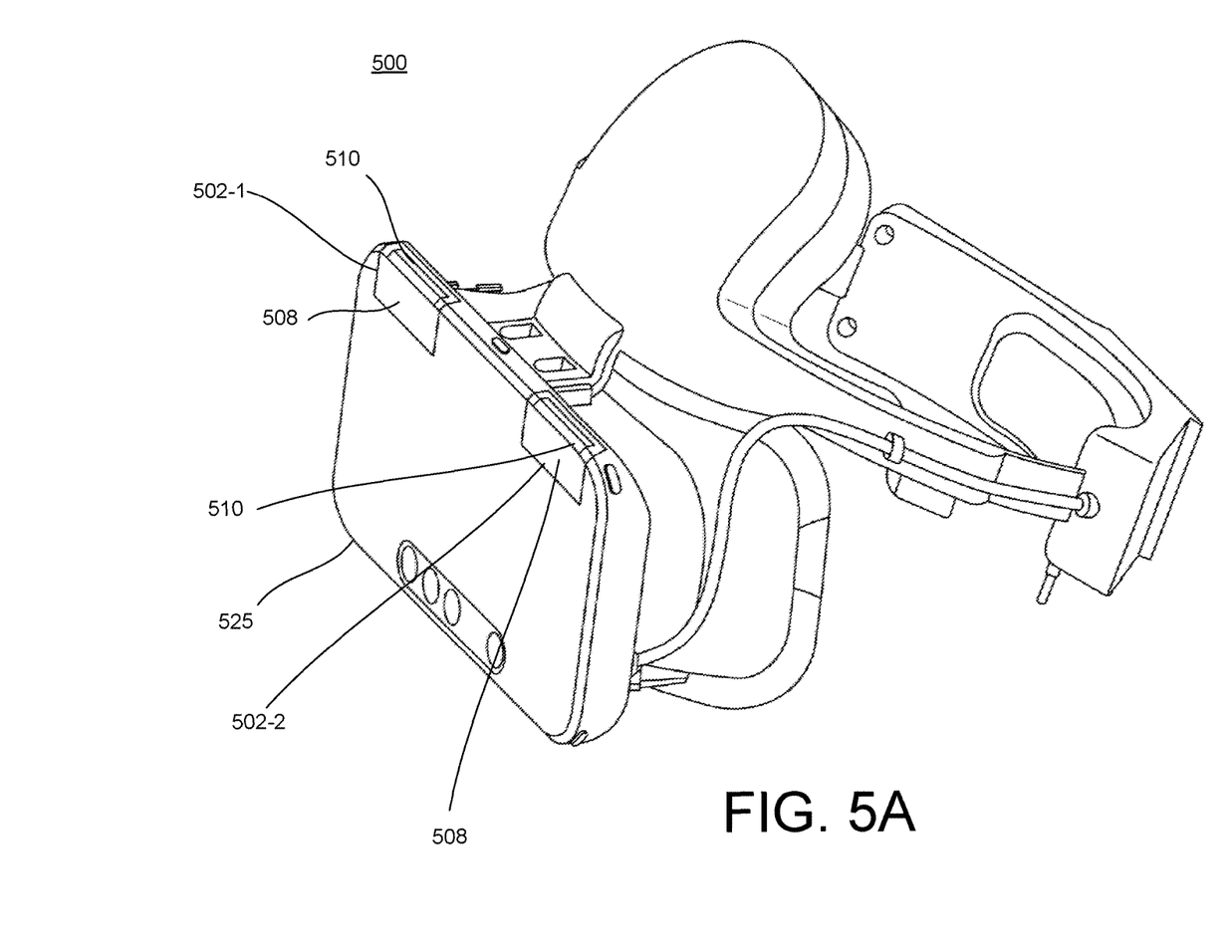
FIG. 5A illustrates an example of a headset having an antenna and heat venting chamber for wireless communication and thermal dissipation according to an implementation.

FIG. 5A illustrates an example of a headset 500 having an antenna and heat venting chamber for wireless communication and thermal dissipation according an implementation. In some examples, the headset 500 is a virtual reality headset. The headset 500 may be relatively compact, but can execute a number of applications, and be capable of wirelessly communicating via one or a number of different network interfaces. As such, the limited space and competing requirements (as well as market pressure for smaller devices), the placement of antennas within the headset 500 may be a relatively large design challenge (even more than tablet/laptop embodiments).

The headset 500 may include a first antenna and heat venting chamber 502-1, and a second antenna and heat venting chamber 502-2 within a metal enclosure 525 of the headset 500. As shown in FIG. 5A, each of the first antenna and heat venting chamber 502-1 and the second antenna and heat venting chamber 502-2 includes a non-metallic side wall member 508 having one or more air vents 510 in order to vent heat from the electronic circuitry included within the headset 500. The non-metallic side wall member 508 may be a plastic cover that is coupled to the metal enclosure 525 of the headset 500. In some examples, the plastic cover may be removably coupled to the metal enclosure 525. The first antenna and heat venting chamber 502-1 and the second antenna and heat venting chamber 502-2 may be positioned within the metal enclosure 525 such that hot air is vented away from the user of the headset 500.

Figure 5B:
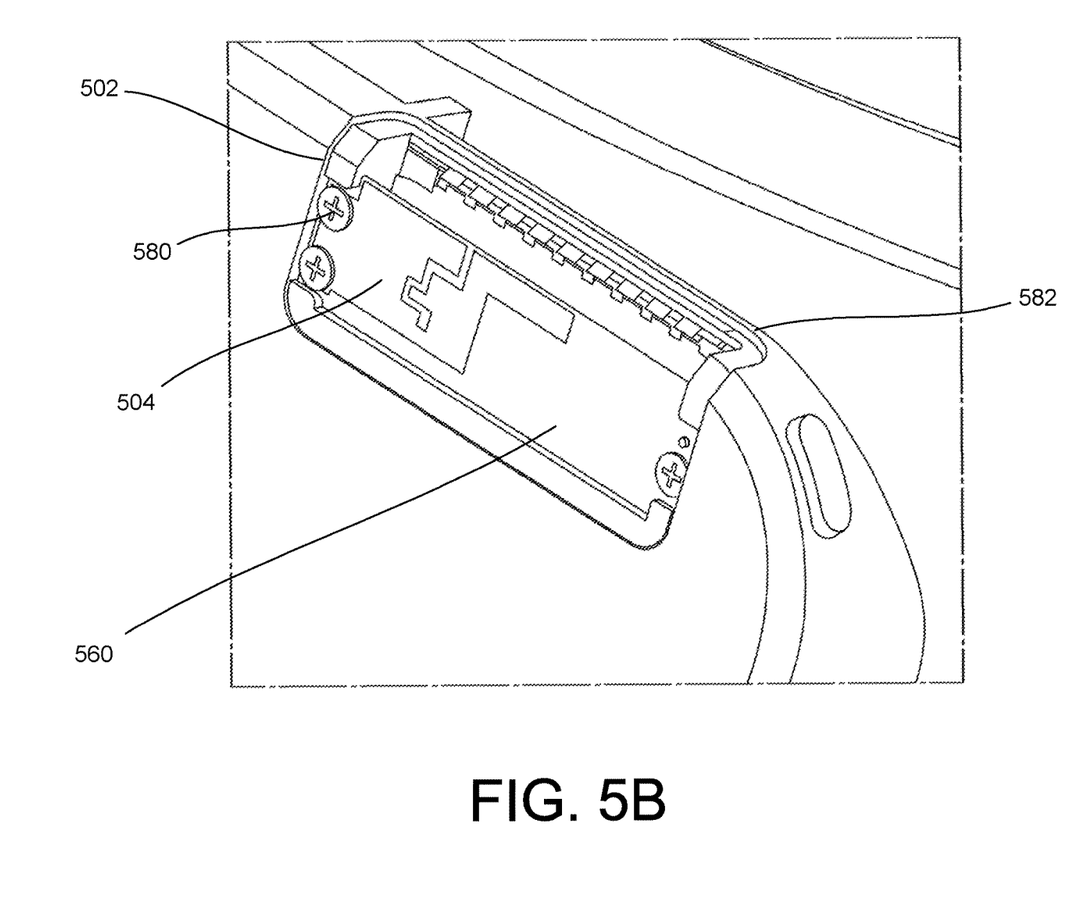
FIG. 5B illustrates another perspective of the antenna and heat venting chamber according to an implementation.

FIG. 5B illustrates another perspective of an antenna and heat venting chamber 502 (e.g., one of the first antenna and heat venting chamber 502-1 and the second antenna and heat venting chamber 502-2) according to an implementation. In FIG. 5B, the plastic cover (e.g., the non-metallic side wall member 508) is invisible. The metal enclosure 525 may define a recess 582 which defines the volume of the antenna and heat venting chamber 502. The antenna and heat venting chamber 502 includes an antenna radiating element 504 coupled to a substrate 560. The substrate 560 may be thin planar printed circuit board. The antenna radiating element 504 may be a thin planar radiating element. The substrate 560 may be coupled to the metal enclosure 525 at a top of the recess 582 via fasteners 580. In some examples, the antenna radiating element 504 is coupled to an outer surface of the substrate 560. In other examples, the antenna radiating element 504 is coupled to an inner surface of the substrate 560 (e.g., facing inside the antenna and heat venting chamber 502).

Figure 5C:
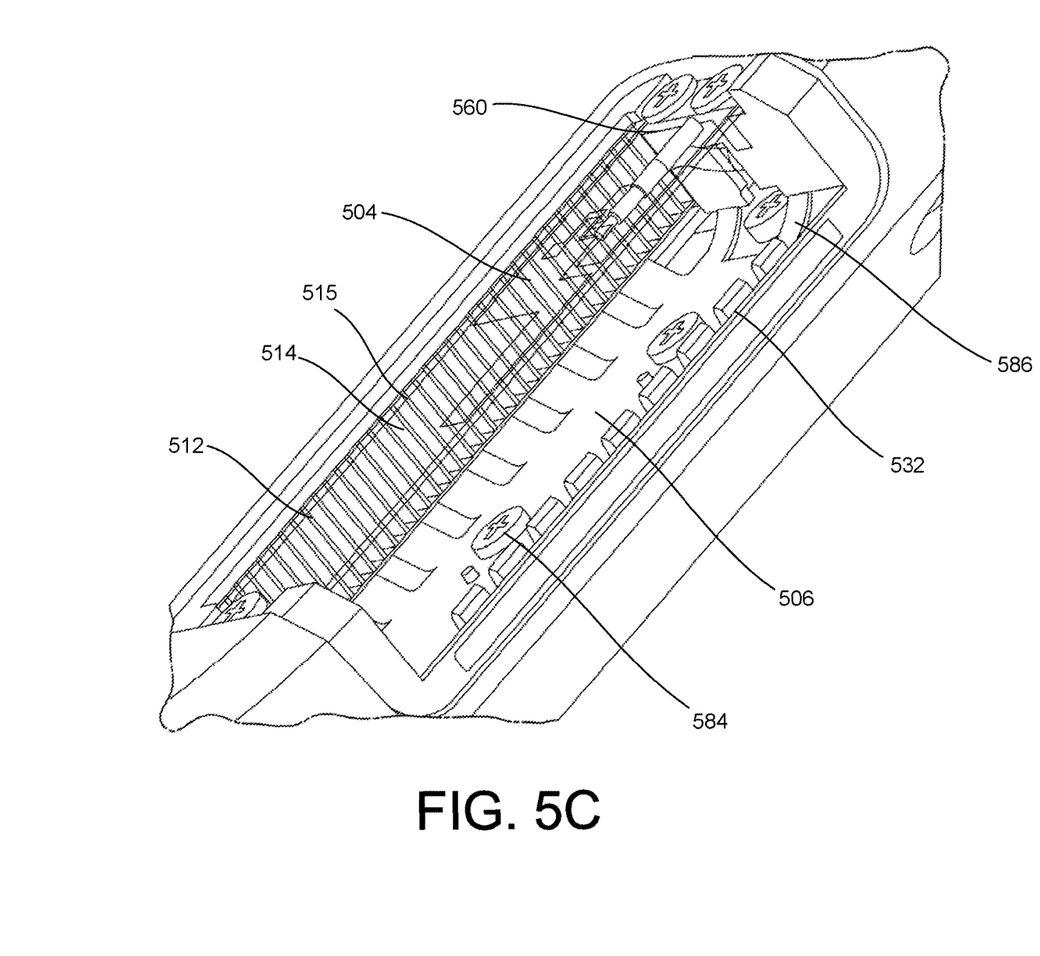
FIG. 5C illustrates another perspective of the antenna and heat venting chamber according to an implementation.

FIG. 5C illustrates another perspective of the antenna and heat venting chamber 502 according to an implementation. The antenna radiating element 504 and the substrate 560 are depicted in wire form to depict the inside of the chamber. As shown in FIG. 5C, the antenna and heat venting chamber 502 includes a ground plane element 506 disposed opposite to the antenna radiating element 504. The ground plane element 506 may be coupled to a metal internal enclosure 532 at the bottom of the recess 582 via fasteners 584. The ground plane element 506 may include a plurality of projections 586 that are disposed around a perimeter of the ground plane element 506, where the projections 586 contact the metal internal enclosure 532 surrounding the antenna radiating element 504 in order to ground these components and create a Faraday cage or shield.

The antenna and heat venting chamber 502 may include a metallic side wall member 512 defining slots 514 between metal fins 515. The slots 514 and the metal fins 515 may extend on one side of the metallic chamber. The slots 514 and the metal fins 515 may have an elongated length that extends orthogonal to the antenna radiating element 504. In some examples, the elongated slot length of the slots 514 and/or the elongated metal fin length of the metal fins 515 are smaller than λ/4 of the highest frequency signal transmitted or received by the antenna radiating element 504. This design parameter of the length of the slots 514 and/or metal fins 515 may assist with reducing the flow of antenna radiation through the metallic side wall member 512 (e.g., in a direction opposite to the air flow direction), while at the same time permitting the flow of hot air through the antenna and heat venting chamber 502, which may increase the performance of the antenna and/or increase the thermal dissipation performance.

The plastic cover or non-metallic side wall member 508 of FIG. 5A may be coupled to the antenna and heat venting chamber 502 such that the air vents 510 are disposed opposite to the slots 514 and the metal fins 515 in order to permit the heat to be vented through the antenna and heat venting chamber 502.

Figure 5D:
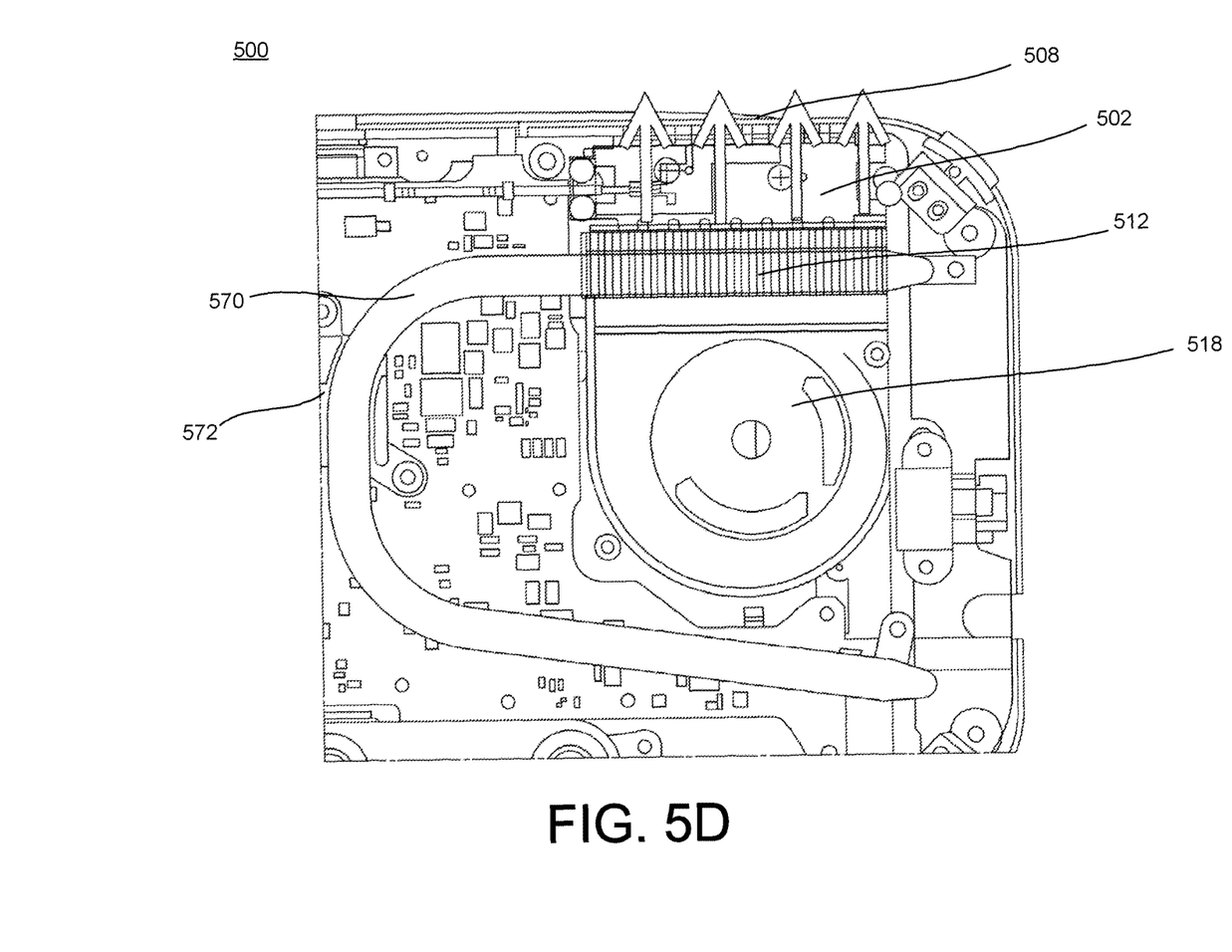
FIG. 5D illustrates another perspective of the antenna and heat venting chamber according to an implementation.

FIG. 5D illustrates another perspective of the headset 500 according to an implementation. The headset 500 may include a fan 518 that induces air flow through the antenna and heat venting chamber 502, and a heat pipe 570 that receives the heat from an electrical component 572. For example, the fan 518 may induce air flow which cools the heat from the heat pipe 570, and that hot air is vented through the antenna and heat venting chamber 502. As shown in FIG. 5D, the antenna and heat venting chamber 502 includes the metallic side wall member 512 and the non-metallic side wall member 508, where heat is vented through the antenna and heat venting chamber 502 and out of the headset 500.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

Unless specifically stated otherwise as apparent from the above discussion, it is appreciated that throughout the description, discussions utilizing terms such as "receiving", or "processing" or "computing" or "calculating" or "determining" or "displaying" or "providing", or "partitioning", or "constructing", or "selecting", or "comparing" or the like, refer to the action and processes of a computer system, or similar electronic computing device, that manipulates and transforms data represented as physical (electronic) quantities within the computer system memories or registers or other such information storage, transmission or display devices.

It will be appreciated that the above embodiments that have been described in particular detail are merely example or possible embodiments, and that there are many other combinations, additions, or alternatives that may be included.

What is claimed is:

1. A computing device comprising:
   electronic circuitry;
   an antenna and heat venting chamber including:
   an antenna radiating element disposed in at least a first plane;
   a ground plane element disposed in at least a second plane, the ground plane element being separated from the antenna radiating element such that a space between the ground plane element and the antenna radiating element defines an antenna bandwidth of the antenna radiating element;
   a first side wall member defining a plurality of perforations, the first side wall member extending between the first plane and the second plane; and
   a second side wall member, the second side wall member having a portion that is disposed opposite to the first side wall member, the portion of the second side wall member defining at least one opening; and
   a cooling system configured to vent heat generated by the electronic circuitry through the space of the antenna and heat venting chamber.

2. The computing device of claim 1, wherein the first side wall member includes a metal material, and the second side wall member includes a non-metal material.

3. The computing device of claim 1, further comprising:
   a substrate coupled to the antenna radiating element.

4. The computing device of claim 3, wherein the antenna radiating element is coupled to an inner surface of the substrate, the inner surface being exposed to a volume enclosed by the antenna and heat venting chamber.

5. The computing device of claim 3, wherein the antenna radiating element is coupled to an outer surface of the substrate, the outer surface being outside a volume enclosed by the antenna and heat venting chamber.

6. The computing device of claim 1, wherein the antenna radiating element is a planar radiating element.

7. The computing device of claim 1, wherein the ground plane element is configured to contact the first side wall member.

8. The computing device of claim 1, wherein a length of each of the plurality of perforations is smaller than $\lambda/4$ of a highest frequency signal transmitted or received by the antenna radiating element.

9. The computing device of claim 1, wherein the cooling system includes a fan.

10. The computing device of claim 1, wherein the antenna and heat venting chamber includes an acoustic chamber.

11. The computing device of claim 1, wherein the second side wall member is a plastic cover.

12. The computing device of claim 1, wherein the antenna radiating element is coupled to a secondary portion of the second side wall member.

13. The computing device of claim 1, wherein the computing device is a virtual reality headset.

14. The computing device of claim 1, wherein the computing device is a laptop.

15. The computing device of claim 1, wherein the computing device is a tablet.

16. A computing device comprising:
   electronic circuitry;
   an antenna and heat venting chamber including:
   an antenna radiating element;
   a ground plane element, the ground plane element being separated from the antenna radiating element such that a space between the ground plane element and the antenna radiating element define an antenna bandwidth of the antenna radiating element;
   a first side wall member defining a plurality of perforations, the plurality of perforations defining metal fins, each of the metal fins having a length that extends between the antenna radiating element and the ground plane element; and
   a second side wall member defining at least one opening; and
   a cooling system configured to vent heat generated by the electronic circuitry through the space of the antenna and heat venting chamber in a first direction that extends through the plurality of perforations and the at least one opening.

17. The computing device of claim 16, wherein the antenna and heat venting chamber is a first antenna and heat venting chamber, and the cooling system is a first fan, the computing device further comprising:
   a second antenna and heat venting chamber; and
   a second fan configured to induce air flow through the second antenna and heat venting chamber.

18. The computing device of claim 16, wherein the length of each of the metal fins is smaller than $\lambda/4$ of a highest frequency of operation for the antenna radiating element.

19. A computing device comprising:
   an antenna and heat venting chamber including:
   a substrate coupled to a metal enclosure of the computing device;
   an antenna radiating element coupled to a surface of the substrate;
   a ground plane element coupled to a metal internal enclosure, the ground plane element being separated from the antenna radiating element such that a space between the ground plane element and the antenna radiating element define an antenna bandwidth of the antenna radiating element;
   a metallic side wall member defining a plurality of metal fins; and
   a non-metallic cover coupled to the metal enclosure and the metal internal enclosure, the non-metallic cover defining at least one opening; and
   a cooling system configured to vent hot air generated by electronic circuitry of the computing device through the antenna and heat venting chamber.

* * * * *